May 17, 1966 W. PABST 3,252,157
CONVERTER
Filed April 30, 1962 2 Sheets-Sheet 1

Inventor:
Wolfgang Pabst
By: George M. Spencer
Attorney

May 17, 1966 W. PABST 3,252,157
CONVERTER
Filed April 30, 1962 2 Sheets-Sheet 2

Inventor:
Wolfgang Pabst
By: George K Spencer
Attorney

United States Patent Office 3,252,157
Patented May 17, 1966

3,252,157
CONVERTER
Wolfgang Pabst, Berlin, Germany, assignor to Licentia Patent-Verwaltungs-G.m.b.H., Frankfurt am Main, Germany
Filed Apr. 30, 1962, Ser. No. 191,111
Claims priority, application Germany, May 4, 1961, L 38,907
18 Claims. (Cl. 340—347)

The present invention relates to analog-digital converters.

There exist analog-digital converters which use rulers or discs that are provided with a number of coded measuring scales in the form of tracks, each of which tracks is sub-divided into recognizable portions as, for example, light-permeable and light-impermeable, i.e., translucent and opaque portions. These tracks can be scanned photo-electrically, this being done by means of a light source arranged on one side of the measuring scales and photo-electric cells on the other. These cells scan the tracks and produce output signals responsive to the passage of the translucent and opaque scale portions past the cells. There exist both rotational and translational converters operating in this manner.

It is an object of the present invention to provide an arrangement of the above general type by means of which the light source, which is an essential part of the photo-electric means for reading the scales, is called upon to deliver as little light as possible and in which the light impinging upon the photocells is concentrated thereon. The purpose of making do with as little light as possible is that the lamp or lamps constituting the light source will then be heated as little as possible, and, in fact, be underheated, thereby increasing the useful life of the lamp or lamps.

With the above object in view, the present invention resides in an analog-digital converter having photo-electrically scanned coded measuring scales arranged along a plurality of rectilinear or circular tracks. There are a plurality of light sources associated with the plurality of tracks, respectively, and a logic circuit connected with the plurality of light sources for monitoring the same and producing an output signal indicative of failure of at least one of the light sources. More particularly, the light sources are arranged to form at least one series circuit connectable across a source of electric energy, and the logic circuit is connected between the center tap of the series circuit formed by the light source and the center tap of the source of electric energy.

Additional objects and advantages of the present invention will become apparent upon consideration of the following description when taken in conjunction with the accompanying drawings in which:

FIGURE 1 does not show the individual measuring scales or tracks, but only the individual lamps for illuminating the same.

Figure 1:
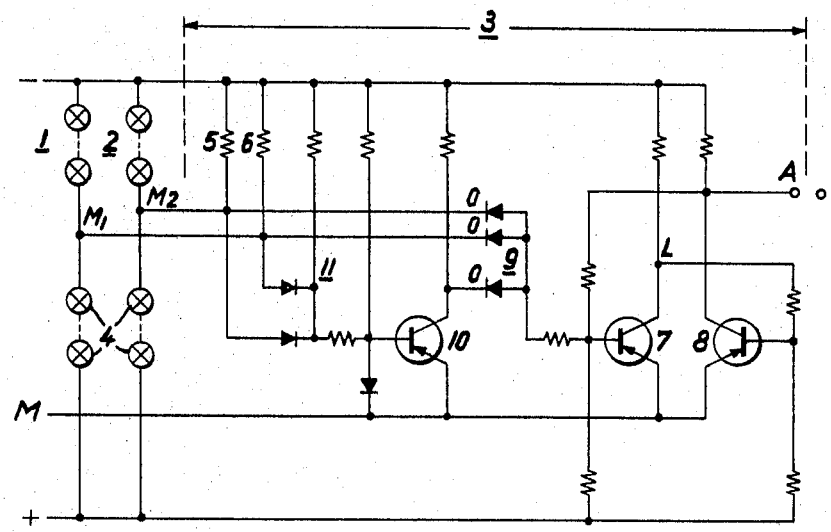
FIGURE 1 is a circuit diagram of an arrangement according to the present invention.

Referring now to the drawings and to FIGURE 1 thereof in particular, the same shows two series of lamps 1, 2, whose ends are connected to the plus and minus terminals, respectively, of a source of electrical energy, represented symbolically by the + and − poles. The voltage source also has a center tap M. The individual lamps 4 of the series 1 and 2 are of a type having a normal operating voltage of, for example, 6 volts, whereas in the circuit according to the present invention, the lamps are operated at a lower voltage of, for example, 4 volts. Consequently, the useful life of the individual bulbs is prolonged. While but two series of bulbs are shown, more can be provided if more than two tracks are to be scanned.

The series 1 and 2 also have center taps $M_1$, $M_2$, respectively. According to the present invention, the center tap M of the source of electrical energy and the center taps $M_1$, $M_2$ of the lamp series are interconnected by a logic circuit 3 composed of rectifiers, e.g., diodes, and transistors. As will be described below, the logic circuit 3 provides a control for determining whether any of the lamps of the series 1 or 2 have become inoperative. The circuit also makes it possible to determine if two lamps within the same series have burned out.

The center taps $M_1$, $M_2$ are at the same electrical potential as the center tap M of the source of electric energy. If now one of the lamps 4 is burned out or otherwise becomes inoperative, the electrical center of the series of which the particular lamp is a part will shift. This will cause the output A of the logic circuit 3 to change, and this change can be utilized for indicating the failure of one of the lamps. In order to obtain a response in case two bulbs 4 of a series fail, the center taps $M_1$, $M_2$ are connected via relatively high-ohmic resistors 5, 6 with one pole of the source of electric energy.

The logic circuit 3 comprises a two-stage transistor amplifier incorporating two transistors 7, 8. Connected ahead of the input of the transistor 7 is an OR-circuit 9, whose inputs, in turn, are connected to the center taps $M_1$, $M_2$, and to a further transistor 10. Connected ahead of the transistor 10 is an AND-stage 11 whose inputs are connected to the center taps $M_1$, $M_2$. The logic circuit 3 can be powered from the same power source which energizes the lamps, as shown in FIGURE 1. Alternatively, the logic circuit can be energized by a different power source, in which case it is possible also to monitor the power source for the lamps and to produce a signal in case this last-mentioned power source fails.

In the starting position of logic circuit 3, the transistor 8 is conductive, which can be deemed to correspond to a signal O. The transistor 7 connected ahead of the transistor 8 is non-conductive, so that the signal L appears at the collector of the transistor 7. Transistor 10 is conductive, so that the signal O will appear at its collector. The center taps $M_1$, $M_2$ will, during normal operation of the lamps, have a potential corresponding to the signal O.

Assuming now that one of the lamps of the series 1 located below the center tap $M_1$ fails, the diode of the OR-stage 9 connected to the center tap $M_1$ becomes conductive. The input of transistor 7 thus becomes negative so that the transistor now changes from its non-conductive to its conductive state. A signal O will then appear at the collector of transistor 7, and, inasmuch as the collector of transistor 7 is galvanically connected to the base of transistor 8, this signal O is applied to that base. As a result, the control signal L will appear at the output A of transistor 8.

Assuming that, instead of one of the lamps of series 1 failing, one of the lamps of series 2—and, more particularly, one of the lamps located above the center tap $M_2$—now fails, this center tap will then be at a positive potential. As a result, the diode of the AND-stage 11 which is connected to center tap $M_2$ now becomes conductive, whereby the input of transistor 10 becomes biased positively. This renders the transistor 10 non-conductive so that the signal L will appear at its collector. This, in turn, renders conductive the diode of the OR-stage 9 which is connected to the collector of transistor 10, so that the input of transistor 7 is biased negatively. The transistor 7 thus changes from non-conductive to conductive state and the signal O will appear at its collector. This signal is likewise effective at the input of transistor 8, so that, in this case too, the control signal L will appear at the output A.

Figure 2:
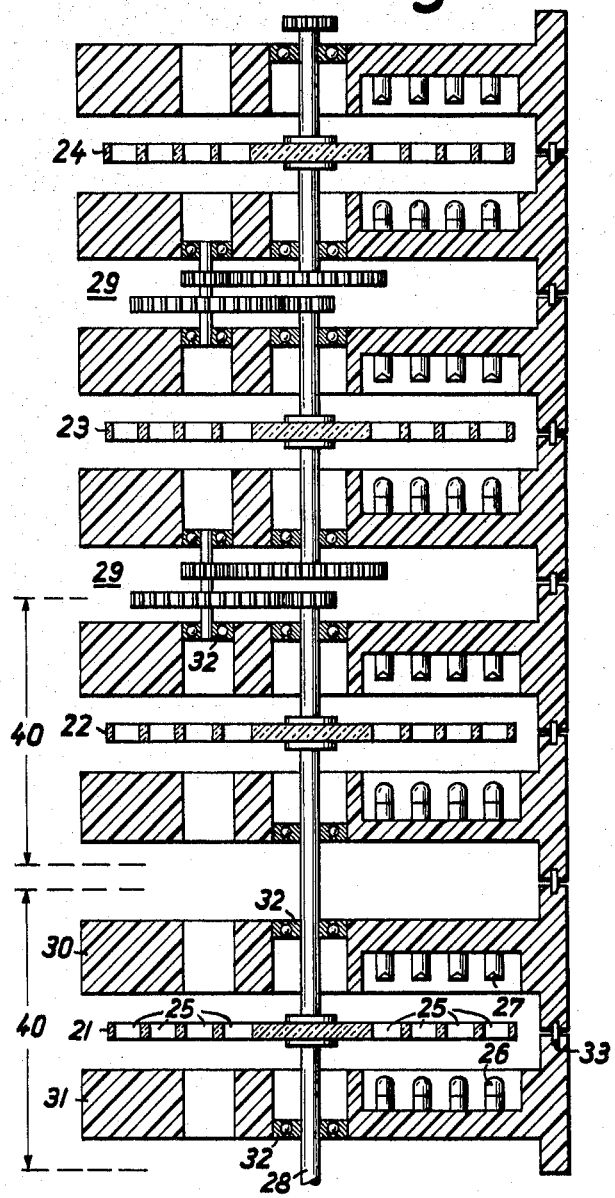
FIGURE 2 is a sectional view showing the structure of an analog-digital converter incorporating an arrangement according to the present invention.

The circuit described above is used to particular advantage in conjunction with an analog-digital converter, shown in FIGURE 2, which uses a number of code disc, these discs being mounted one after the other, for rotation about a common axis and being coupled to each other by means of a speed change transmission drive. Such converters can, for example, be equipped with code discs having four tracks, which corresponds to an intelligence value having a width of 4 bits. In practice, up to five or more discs can be provided. If the converter has four discs, then $4 \times 4 = 16$ tracks will have to be scanned. If the so-called Kliever scanning system is used, the number is correspondingly higher.

According to the present invention, the necessary number of lamps, shown individually in FIGURE 1 at 4, are provided. The operability of all of the lamps is continuously monitored by means of the logic circuit 3 shown in FIGURE 1. If a total of sixteen lamps are used, each of the two series will include eight lamps. If more lamps are required, longer and/or additional lamp series can be provided. The center taps of said further lamp series are then connected to the OR-circuit 9 in a manner similar to that of $M_1$, $M_2$, described above; all that is involved is that the OR-stage 9 and AND-stage 11 will each be provided with the appropriate number of additional diodes connected to the appropriate center taps.

Referring now more particularly to FIGURE 2, the same shows a converter using four code discs. The discs 21, 22, 23, 24 are provided with tracks 25, shown schematically, which may, for example, be divided into black and white segments. The discs themselves may be made of glass. On one side of each of the discs 21, 22, 23, 24, there are lamps 26 for each track, whereas light-sensitive scanning elements, as, for example, photo-electric cells or diodes 27, are arranged, one for each track, on the other side of each disc. The discs 21 and 22 are mounted on a common shaft 28 whose end may carry a pinion (not shown) cooperating with a rack (not shown) so as to allow the measurement of translatory movement. All of the discs have the same diameter and are mounted one after the other. They differ from each other in the specifics of the black/white segmentation of the tracks. The lamps 26 may have arranged ahead of them an optical focussing arrangement which projects the filaments of the respective lamps onto the corresponding photocells 27. Furthermore, each of the lamps 26 can have a slotted mask arranged ahead of it, so as to form a narrow light beam. Basically, the construction of the lamps, projection means if any, and photocells associated with each track, is the same.

The disc 23 is coupled to the disc 22 via a reduction gearing 29. The discs 23 and 24 are similarly coupled to each other. If desired, further code discs could be connected to disc 24 via further reduction gearings 29. The gearings 29 are so arranged that, for example, the last value of the code disc 22 coincides with the first value of the next coupled disc 23. In this way, the last and first values are, in a manner of speaking, connected with each other via the gearings which interconnect consecutive discs. The discs 23 and 24 are similarly interconnected by a reduction gearing 29.

In the illustrated embodiment, each code disc has four tracks. The transmission ratio of the gearings is therefore $1:2^4 = 1:16$. If more tracks are used, the transmission ratio will be adjusted accordingly.

FIGURE 2 also shows how the structure is made up of individual modular units. Each set of discs 21, 22, 23, 24, forms, together with its lamps 26 and scanning elements 27, a modular unit 40. A number of such units can easily be connected together, so that it is simple to provide a converter which is adapted to the particular task it is to carry out.

Each modular unit comprises two carriers 30, 31, which carriers have the same shape. They can be square or disc-shaped, and can serve to mount the bearings 32 for the shaft 28 and gearings 29. The lamps 26 and scanning elements 27 are likewise monuted on the carriers. In practice, it is expedient to mount the lamp control circuit, described above in connection with FIGURE 1, within one or more of the carriers. The individual carriers are suitably interconnected, such as by connecting elements 33. These elements may also be used to interconnect adjacent modular units. The carriers themselves may be made of any suitable material, preferably a hard-enable plastic which can be molded at low pressure.

The invention is not limited to a converter having carriers of the above-described configuration, since they may have other shapes as well. While it is desirable to have the converter made up, in a simple manner, of one or more units 40, the carriers can, for purposes of easy assembly of the various component parts, be made, instead of one, of several pieces.

It will be understood that the above description of the present invention is susceptible to various modifications, changes, and adaptations, and the same are intended to be comprehended within the meaning and range of equivalents of the appended claims.

What is claimed is:

1. In an analog-digital converter having photo-electrically scanned coded measuring scales arranged along a plurality of tracks, respectively, the combination which comprises:
    (a) a plurality of light sources associated with the plurality of tracks, respectively, said light sources being arranged to form at least one series circuit connectable across a source of electric energy; and
    (b) a logic circuit connected between the center tap of the series circuit formed by said light sources and the center tap of the source of electric energy for producing an output signal indicative of failure of at least one of said light sources resulting in imbalance of said series circuit.

2. In an analog-digital converter having photo-electrically scanned coded measuring scales arranged along a plurality of tracks, respectively, the combination which comprises:
    (a) a plurality of light sources associated with the plurality of tracks, respectively, said light sources being arranged to form at least one series circuit connectable across a source of electric energy; and
    (b) a logic circuit connected between the center tap of the series circuit formed by said light sources and the center tap of the source of electric energy for producing an output signal indicative of failure of at least one of said light sources resulting in imbalance of said series circuit, said logic circuit comprising:
        (1) AND-circuit means having inputs connected, respectively, to the center tap of said series circuit and to the center tap of the source of electric energy; and
        (2) OR-circuit means having inputs connected, respectively, to the center tap of said series circuit and to the output of said AND-circuit means.

3. In an analog-digital converter having photo-electrically scanned coded measuring scales arranged along a plurality of tracks, respectively, the combination which comprises:
    (a) a plurality of light sources associated with the plurality of tracks, respectively, said light sources being arranged to form at least one series circuit connectable across a source of electric energy; and
    (b) a logic circuit connected between the center tap of the series circuit formed by said light sources and the center tap of the source of electric energy for producing an output signal indicative of failure of at least one of said light sources resulting in imbalance of said series circuit, said logis circuit comprising:
(1) an AND-circuit having inputs connected, respectively, to the center tap of said series circuit and to the center tap of the source of electric energy;
(2) first transistor means having its input connected to the output of said AND-circuit;
(3) an OR-circuit having inputs connected, respectively, to the center tap of said series circuit and to the output of said first transistor means; and
(4) second transistor means having its input connected to the output of said OR-circuit.

4. In an analog-digital converter having photo-electrically scanned coded measuring scales arranged along a plurality of tracks, respectively, the combination which comprises:
(a) a plurality of light sources associated with the plurality of tracks, respectively, said light sources being arranged to form at least one series circuit connectable across a source of electric energy; and
(b) a logic circuit connected between the center tap of the series circuit formed by said light sources and the center tap of the source of electric energy for producing an output signal indicative of failure of at least one of said light sources resulting in imbalanse of said series circuit, said logic circuit comprising:
(1) an AND-circuit having inputs connected, respectively, to the center tap of said series circuit and to the center tap of the source of electric energy;
(2) first transistor means having its input connected across the output of said AND-circuit and the center tap of the source of electric energy;
(3) an OR-circuit having inputs connected, respectively, to the center tap of said series circuit and to the output of said first transistor means; and
(4) second transistor means having its input connected across the output of said OR-circuit and the center tap of the source of electric energy.

5. The combination defined in claim 1 wherein said logic circuit is energizable by a source of electric energy other than that which energizes said plurality of light sources, whereby said logic circuit may be relied upon to produce an output signal indicative of the failure of the source of electric energy across which the plurality of light sources are connected.

6. The combination defined in claim 1, further comprising resistor means connected across said center tap of said series circuit and one of the end terminals of said series circuit.

7. In an analog-digital converter having photo-electrically scanned coded measuring scales arranged along a plurality of tracks, respectively, the combination which comprises:
(a) a plurality of light sources associated with the plurality of tracks, respectively; and
(b) a logic circuit connected with said plurality of light sources for monitoring the same and producing an output signal indicative of failure of at least one of said light sources.

8. In an analog-digital converter, the combination which comprises:
(a) a plurality of code discs each having the same number of photo-electrically scannable coded measuring scales arranged along a plurality of tracks, respectively;
(b) gear means interconnecting said code discs;
(c) a plurality of light sources associated with the plurality of tracks, respectively, said light sources being arranged to form at least one series circuit connectable across a source of electric energy; and
(d) a single logic circuit connected between the center tap of the series circuit formed by said light sources and the center tap of the source of electric energy for producing an output signal indicative of failure of at least one of said light sources resulting in imbalance of said series circuit.

9. The combination defined in claim 8 wherein said discs are of the same diameter.

10. The combination defined in claim 8 wherein said discs are arranged consecutively and wherein said gear means interconnect consecutive ones of said discs.

11. The combination defined in claim 8, made up of modular units.

12. The combination defined in claim 11 wherein each modular unit comprises:
(a) one respective disc;
(b) two similarly constructed carriers arranged on opposite sides of said disc, respectively;
(c) means for rotationally mounting said respective disc on said carriers;
(d) such light sources as are associated with the tracks of the respective disc; and
(e) photo-electric means associated with said last-mentioned tracks.

13. The combination defined in claim 12, further comprising connecting means by which said modular units may be joined to each other.

14. For use in an analog-digital converter, a modular unit comprising, in combination:
(a) two spaced apart carrier members;
(b) a code disc having a plurality of photo-electrically scannable coded measuring scales arranged along a plurality of tracks, respectively, said disc being mounted between said carrier members for rotation about an axis;
(c) a plurality of light sources mounted on one of said carriers for illuminating the plurality of tracks, respectively, said light sources being arranged to form at least one series circuit connectable across a source of electric energy;
(d) a logic circuit connected between the center tap of the series circuit formed by said light sources and the center tap of the source of electric energy for producing an output signal indicative of failure of at least one of said light sources resulting in imbalance of said series circuit;
(e) a plurality of photo-electric scanning means mounted on the other of said carriers and associated with said tracks for receiving therefrom illumination cast thereon by said light sources; and
(f) means for connecting the modular unit to another modular unit.

15. An analog-digital converter comprising a plurality of connected modular units as defined in claim 14, the plurality of light sources from all of said units being electrically interconnected to form at least one series circuit.

16. In combination with a plurality of light sources connected in series circuit which series circuit itself is connectible across a source of electric energy, a logic circuit connected between the center tap of said series circuit and the center tap of the source of electric energy for producing an output signal indicative of failure of at least one of said light sources resulting in imbalance of said series circuit, said logic circuit comprising, in combination:
(1) AND-circuit means having inputs connected, respectively, to the center tap of said series circuit and to the center tap of the source of electric energy; and
(2) OR-circuit means having inputs connected, respectively, to the center tap of said series circuit and to the output of said AND-circuit means.

17. In combination with a plurality of light sources connected in series circuit which series circuit itself is connectible across a source of electric energy, a logic circuit connected between the center tap of said series circuit and the center tap of the source of electric energy for producing an output signal indicative of failure of at least one of said light sources resulting in imbalance of said series circuit, said logic circuit comprising, in combination:
(1) an AND-circuit having inputs connected, respectively, to the center tap of said series circuit and to the center tap of the source of electric energy;
(2) first transistor means having its input connected to the output of said AND-circuit;
(3) an OR-circuit having inputs connected, respectively, to the center tap of said series circuit and to the output of said first transistor means; and
(4) second transistor means having its input connected to the output of said OR-circuit.

18. In combination with a plurality of light sources connected in series circuit which series circuit itself is connectible across a source of electric energy, a logic circuit connected between the center tap of said series circuit and the center tap of the source of electric energy for producing an output signal indicative of failure of at least one of said light sources resulting in imbalance of said series circuit, said logic circuit comprising, in combination:
(1) an AND-circuit having inputs connected, respectively, to the center tap of said series circuit and the center tap of the source of electric energy;
(2) first transistor means having its input connected across the output of said AND-circuit and the center tap of the source of electric energy;
(3) an OR-circuit having inputs connected, respectively, to the center tap of said series circuit and to the output of said first transistor means; and
(4) second transistor means having its input connected across the output of said OR-circuit and the center tap of the source of electric energy.

References Cited by the Examiner

UNITED STATES PATENTS

| | | | |
|---|---|---|---|
| 2,779,539 | 1/1957 | Darlington | 340—347 |
| 2,793,807 | 5/1957 | Yaeger | 340—347 |
| 2,966,673 | 12/1960 | Guernsey | 340—347 |
| 3,076,123 | 1/1963 | McDermott | 340—251 |

OTHER REFERENCES

Pages 1–4, July EC–2, 3, 1953, IRE Transactions on Electronic Computers.

MALCOLM A. MORRISON, *Primary Examiner.*

K. R. STEVENS, *Assistant Examiner.*